United States Patent [19]

Vanderborgh et al.

[11] Patent Number: 5,271,916

[45] Date of Patent: Dec. 21, 1993

[54] DEVICE FOR STAGED CARBON MONOXIDE OXIDATION

[75] Inventors: Nicholas E. Vanderborgh, Los Alamos, N. Mex.; Trung V. Nguyen, College Station, Tex.; Joseph Guante, Jr., Denver, Colo.

[73] Assignee: General Motors Corporation, Detroit, Mich.

[21] Appl. No.: 908,421

[22] Filed: Jun. 30, 1992

Related U.S. Application Data

[63] Continuation of Ser. No. 726,595, Jul. 8, 1991, abandoned.

[51] Int. Cl.$^5$ .............................................. C01B 31/18
[52] U.S. Cl. ................................... 423/246; 423/247; 423/652; 422/177; 422/180; 422/198; 429/12
[58] Field of Search ................ 423/246, 247, 652; 422/177, 180, 198; 429/12

[56] References Cited

U.S. PATENT DOCUMENTS

| | | | |
|---|---|---|---|
| 3,088,919 | 5/1963 | Brown, Jr. et al. | 252/374 |
| 3,216,782 | 11/1965 | Cohn | 23/2 |
| 3,216,783 | 11/1965 | Cohn | 23/2 |
| 4,238,468 | 12/1980 | Bonacci et al. | 423/359 |
| 4,650,727 | 3/1987 | Vanderborgh et al. | 429/19 |
| 4,789,540 | 12/1988 | Jenkins | 423/648.1 |
| 5,061,464 | 10/1991 | Cordonna, Jr. et al. | 423/213.5 |

FOREIGN PATENT DOCUMENTS

| | | | |
|---|---|---|---|
| 54-151560 | 11/1979 | Japan | 422/177 |
| 58-152093 | 9/1983 | Japan | 423/247 |
| 63-72788 | 4/1988 | Japan | 423/247 |
| 63-162501 | 7/1988 | Japan | 423/652 |

OTHER PUBLICATIONS

"The Hot Spot TM Reactor: Hydrogen Generation Using a Novel Concept" by J. W. Jenkins and E. Shutt Platinum Metals Rev., 1989, 33 (3), 118–127.
PROX Process Briefly Described on p. 2 of the Statement of Work Attachment of Department of Energy "Funds-in-Agreement" contract No. DE-FI04-8-7A145772. Jul. 7, 1987.
PROX Process described in a paper entitled "Methanol Fuel Processing for Low Temperature Fuel Cells" published in the Program and Abstracts of the 1988 Fuel Cell Seminar, Oct. 23–26, 1988, Long Beach, California.

*Primary Examiner*—Gary P. Straub
*Assistant Examiner*—Timothy C. Vanoy
*Attorney, Agent, or Firm*—Lawrence B. Plant

[57] ABSTRACT

A method and apparatus for selectively oxidizing carbon monoxide in a hydrogen rich feed stream. The method comprises mixing a feed stream consisting essentially of hydrogen, carbon dioxide, water and carbon monoxide with a first predetermined quantity of oxygen (air). The temperature of the mixed feed/oxygen stream is adjusted in a first the heat exchanger assembly (20) to a first temperature. The mixed feed/oxygen stream is sent to reaction chambers (30,32) having an oxidation catalyst contained therein. The carbon monoxide of the feed stream preferentially absorbs on the catalyst at the first temperature to react with the oxygen in the chambers (30,32) with minimal simultaneous reaction of the hydrogen to form an intermediate hydrogen rich process stream having a lower carbon monoxide content than the feed stream. The elevated outlet temperature of the process stream is carefully controlled in a second heat exchanger assembly (42) to a second temperature above the first temperature. The process stream is then mixed with a second predetermined quantity of oxygen (air). The carbon monoxide of the process stream preferentially reacts with the second quantity of oxygen in a second stage reaction chamber (56) with minimal simultaneous reaction of the hydrogen in the process stream. The reaction produces a hydrogen rich product stream having a lower carbon monoxide content than the process stream. The product stream is then cooled in a third heat exchanger assembly (72) to a third predetermined temperature. Three or more stages may be desirable, each with metered oxygen injection.

24 Claims, 2 Drawing Sheets

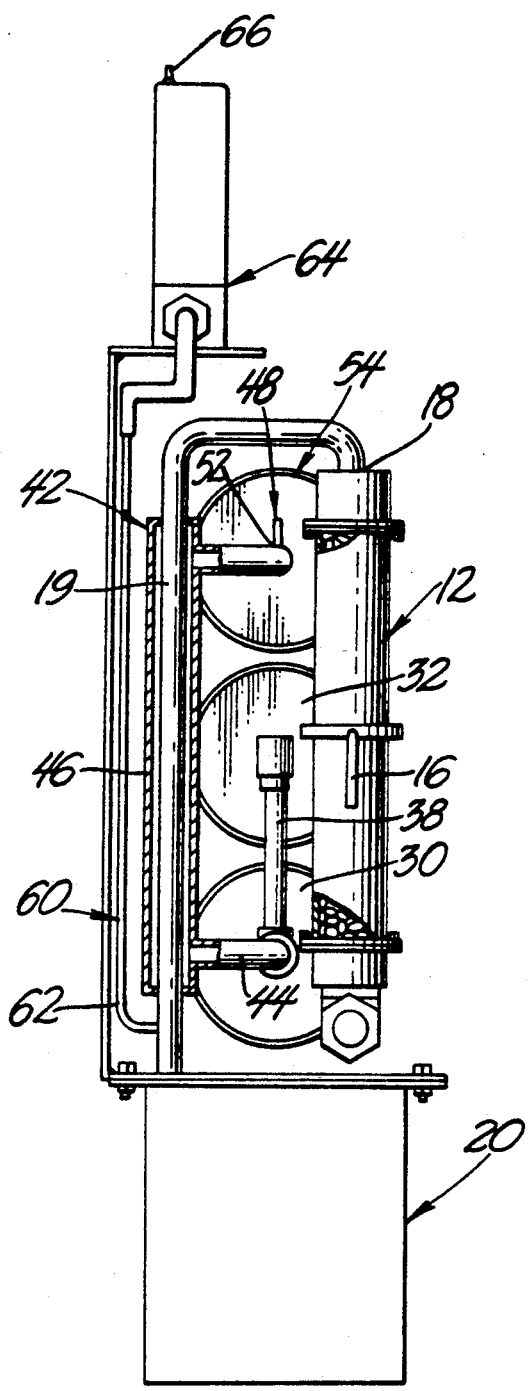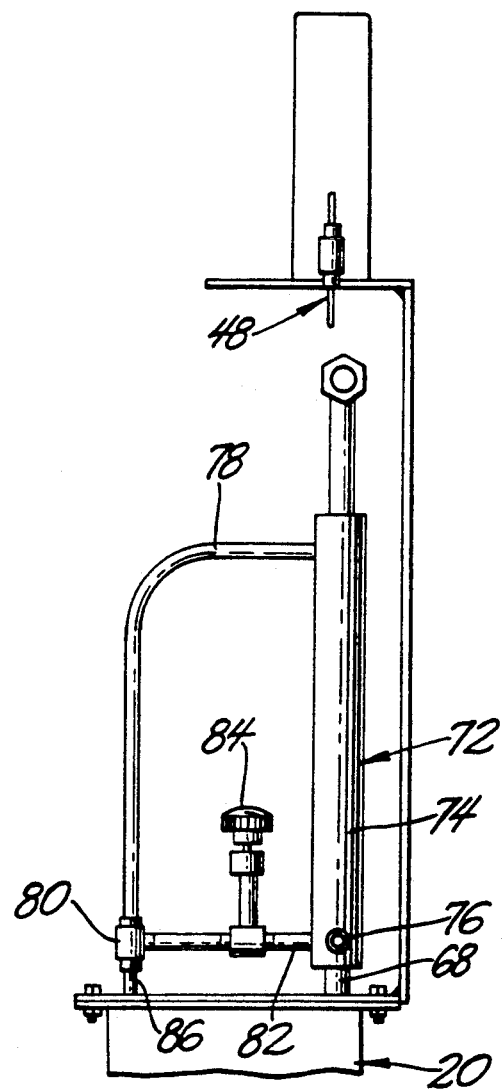
Fig. 2
Fig. 3

DEVICE FOR STAGED CARBON MONOXIDE OXIDATION

The Government of the United States of America has rights in this invention pursuant to Agreement No. De-F104-87-AL45772 awarded by the U.S. Department of Energy.

This is a continuation of application Ser. No. 07/726,595 filed on Jul. 8, 1991 now abandoned.

BACKGROUND OF THE INVENTION

(1) Field of the Invention

The present invention relates to a method and assembly for preferentially reducing the carbon monoxide content of a hydrogen rich stream consumed in a fuel cell power system.

(2) Description of the Prior Art

Fuel cell power systems have been used to supply power when internal combustions are not practical, such as in manned space vehicles. Fuel cell power systems have also been proposed as electrical vehicular power plants to replace internal combustion engines. Typically, a hydrogen stream is used for the fuel source for an electrochemical fuel cell that converts hydrogen at the anode or fuel electrode (using oxygen or air as the oxidant in the cathode process) to electrical energy.

The hydrogen used in the fuel cell can be derived from the reformation of methanol according to the reaction:

$$CH_3OH + H_2O \rightarrow CO_2 + 3H_2$$

In the methanol reformation process, methanol and water (steam) are reacted to generate hydrogen and carbon dioxide. This reaction is accomplished heterogeneously within a chemical reactor that provides the necessary thermal energy throughout the catalyst mass. One such forced convective reformer is disclosed in U.S. Pat. No. 4,650,727 to Vanderborgh.

A small amount of carbon monoxide is typically generated during the methanol reformation process. Carbon monoxide, even at low concentrations, must be removed from the hydrogen rich gas stream because carbon monoxide causes degradation within the fuel cell. Carbon monoxide is usually formed in concentrations between 1 and 3 mole percent, depending on process conditions.

It has been known that the carbon monoxide level of the gases emanating from a methanol reformer can be reduced by utilizing a "shift" reaction. In the shift reaction, water is added to the methanol reformer output gas to lower its temperature from about 250° C. to about 190° C. and increase the steam to carbon ratio therein. This increased steam to carbon ratio serves to lower the carbon monoxide content of the product gas by the shift reaction (This reaction occurs in the presence of a shift catalyst):

$$CO + H_2O \rightarrow CO_2 + H_2$$

Depending upon the flow rates and the steam injection rate, the carbon monoxide content of the gas exiting the shift reactor can be as low as 0.5%. Concurrently, almost all the residual methanol is thus converted to carbon dioxide and hydrogen, because of reaction on active sites in the shift catalyst.

Due to the poisoning of the fuel cell anode, even small concentrations of carbon monoxide (50 parts per million, and lower) can cause severe performance degradation in the fuel cell. This is illustrated by a decreased voltage output in the presence of carbon monoxide. Therefore, it is necessary to further remove carbon monoxide from the hydrogen rich stream prior to injection into the fuel cell device.

SUMMARY OF THE INVENTION

According to the present invention, there is provided a method of reducing the carbon monoxide content of the feed stream derived from the reformation of methanol for use in a fuel cell that consumes hydrogen as a fuel source, the feed stream consists essentially of hydrogen, carbon dioxide, water and carbon monoxide. The method comprises the steps of adjusting the feed stream to a first predetermined temperature and reacting the carbon monoxide in the feed stream with a first predetermined quantity of oxygen (either pure oxygen, or oxygen contained in air) at the first predetermined temperature in the presence of a catalyst without substantial reaction of the hydrogen in the feed stream to form a process stream consisting essentially of hydrogen, carbon dioxide, water and carbon monoxide with less carbon monoxide content than in the feed stream. The process stream is then removed from the catalyst. The temperature of the process stream is maintained at a second predetermined temperature which is higher than the first predetermined temperature. The carbon monoxide in the process stream is then reacted with a second predetermined quantity of oxygen (air) at the second predetermined temperature without substantial reaction of the hydrogen in the process stream to form a product stream consisting essentially of hydrogen, carbon dioxide, water and carbon monoxide with less carbon monoxide content than in the process stream. The product stream is then cooled.

The subject invention also includes an assembly for reducing the carbon monoxide content of the feed stream of gases consisting essentially of hydrogen, carbon dioxide, water and carbon monoxide which is derived from the reformation of methanol to provide hydrogen for consumption in a fuel cell. The assembly includes oxygen (air) inlet means for allowing a first predetermined quantity of oxygen (air) to be mixed with the feed stream. The assembly includes a first heat exchanger means for adjusting the temperature of the feed stream to a first predetermined temperature. A first reaction means in fluid communication with the first heat exchanger means is included having a catalyst therein for adsorbing the carbon monoxide of the feed stream on the catalyst at the first predetermined temperature to react the carbon monoxide of the feed stream with the predetermined quantity of oxygen (air) without substantial reaction of the hydrogen in the feed stream to form a process stream consisting essentially of hydrogen, carbon dioxide, water and carbon monoxide with less carbon monoxide content than the feed stream. The assembly further includes second heat exchanger means in fluid communication with the first reaction means for receiving the process stream and for adjusting the temperature of the process stream to a second predetermined temperature higher than the first predetermined temperature. Second oxygen (air) inlet means is included for allowing a second predetermined quantity of oxygen (air) to be mixed with the process stream. Second reaction means in fluid communication with the second heat exchanger means is included for receiving the process stream mixed with the second predetermined quantity of oxygen (air) and for reacting the carbon monoxide in the process stream with a second predetermined quantity of oxygen (air) at the second predetermined temperature without substantial reaction of the hydrogen in the process stream to form a product stream consisting essentially of hydrogen, carbon dioxide, water and carbon monoxide with less carbon monoxide content than in the process stream.

According to the present invention, there is provided a method and assembly for preferentially oxidizing the carbon monoxide of the feed stream to carbon dioxide to thereby reduce the carbon monoxide content of the feed stream (derived from the output of the methanol reformer) to a level tolerable to a fuel cell. The carbon monoxide content is preferentially reduced without reacting substantial quantities of hydrogen in the feed stream.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a side view taken along line 2—2 of FIG. 1 and partially in cross-section; and FIG. 3 is a side view taken substantially along lines 3—3 of FIG. 1.

DESCRIPTION OF THE PREFERRED EMBODIMENT

Figure 1:
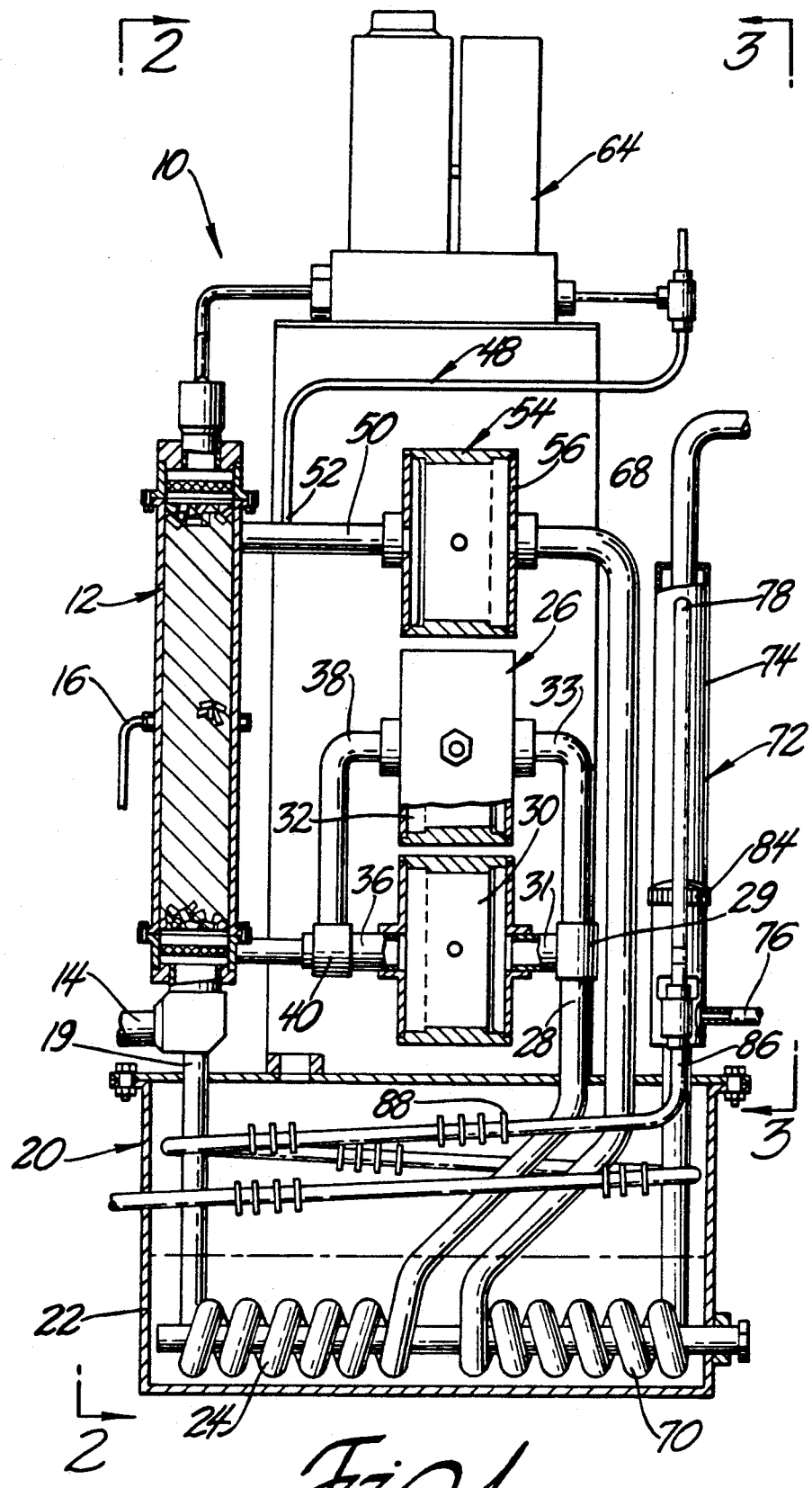
FIG. 1 is an elevational view of the assembly made in accordance with the present invention partially in cross-section.

An assembly for reducing the carbon monoxide content of a feed stream of gases consisting essentially of hydrogen, carbon dioxide, water and carbon monoxide which is derived from the reformation of methanol to provide hydrogen for consumption in a fuel cell is generally shown at 10 in the Figures.

The feed stream is derived from the reformation of methanol according to the reaction:

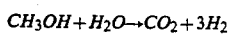
$CH_3OH + H_2O \rightarrow CO_2 + 3H_2$

During this reaction, slight amounts of carbon monoxide are also generated as a by-product due to the equilibrium reaction between hydrogen, carbon dioxide, carbon monoxide and water. Therefore, the gases entering the assembly 10 consist essentially of carbon monoxide, carbon dioxide and hydrogen In order to reduce the carbon monoxide concentration, these gases typically enter a shift reactor 12 through a shift reactor inlet 14. In the shift reactor 12, water in the form of steam is added through the water inlet 16 to prompt the shift reaction according to the reaction:

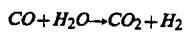
$CO + H_2O \rightarrow CO_2 + H_2$

The shift reaction prompts a reduction of the carbon monoxide content of the feed stream by oxidizing the carbon monoxide to form carbon dioxide. The reduction of carbon monoxide concentration in the shift reactor, however is not sufficient to allow the gasses to pass directly for use in a fuel cell. Therefore, the gases leave the shift reactor 12 through a shift reactor outlet 18 (as best seen in FIG. 2) and comprise the feed stream for the subject method and assembly 10. The feed stream predominately includes hydrogen and also includes carbon dioxide, water (in the form of steam) and carbon monoxide. The feed gases exiting from the shift reactor outlet 18 are used to cool a process stream (as will be described in detail subsequently). The aforesaid shift reaction can reduce the carbon monoxide content to between about 0.3% and 0.5% of the volume in the feed stream. However, the remaining carbon monoxide content is still too high for use in a reactant stream for fueling a fuel cell in which hydrogen is converted to electrical energy at the anode of the fuel cell.

It will be appreciated that in certain instances it is desirable to remove the water (steam) from the feed stream. This can be accomplished after the feed stream leaves the shift reactor by any suitable condensation or absorption technique well known in the art. If this is the case, the content of the feed stream is as described above, but is free of any water (steam). Otherwise, system operation as described below is the same.

Briefly, the method of the subject invention includes a multiple stage process for preferentially reacting small quantities of oxygen (air) with carbon monoxide of the feed stream to form carbon dioxide. The hydrogen in this feed stream will ultimately be consumed in the fuel cell. Preferably only an insubstantial amount of hydrogen from the feed stream will react with oxygen (air) to maximize the available hydrogen for later use in the fuel cell.

In the first stage of the process, the temperature, the quantity of oxygen, and a catalyst are selected so that the reduced carbon monoxide content of the feed stream (typically 1% volume) is preferentially adsorbed onto the reactive catalyst sites to preferentially react the carbon monoxide with the oxygen (air) rather than the hydrogen of the feed stream. The resultant stream is a process stream having a lower carbon monoxide content (about 0.05% volume) than the incoming feed stream.

In the second stage of the process, the carbon monoxide concentration in the process stream is lower than in the feed stream i.e., less than 0.01%. Therefore, preferential reaction of the carbon monoxide by preferential adsorption contrasted to hydrogen adsorption onto catalyst sites is not useful. In order to preferentially react the carbon monoxide of the process stream, the temperature and quantity of oxygen (air) are selected to take advantage of the relative reaction rates and activation energies for the oxidation reactions of both carbon monoxide and hydrogen. In the second stage, the carbon monoxide (rather than the hydrogen) content of the process stream is preferentially reacted with the oxygen (air) to form a product stream having less carbon monoxide content than the process stream.

Through this two stage process, a significant portion of the carbon monoxide of the feed stream is oxidized (to carbon dioxide) to thereby reduce the carbon monoxide content of the feed stream without substantial reaction of the hydrogen. The result is a hydrogen rich stream having a suitably low carbon monoxide concentration (less than 0.01% volume) for consumption in a fuel cell.

More specifically, the feed gases emanating from the shift reactor through the outlet 18 flow through the feed stream conduit 19 and are mixed with a first predetermined quantity of oxygen (air). The oxygen (air) is metered using precise flow control to enter at the first oxygen (air) inlet means generally indicated at 60. The first oxygen (air) inlet means 60 comprises a first oxygen (air) inlet conduit 62 secured to the feed stream conduit 19 and in fluid communication therewith for allowing the first predetermined quantity of oxygen (air) to be mixed with the feed stream in the feed stream conduit 19.

The quantity of oxygen (air) delivered to the system is measured and directed by a flow controller generally indicated at 64. Operation and design of fluid flow controller are known to those skilled in the art and its description is not essential to an understanding of the present invention the present invention. It is, however, important that the appropriate quantity of oxygen (air) is delivered to the system. The preferred total amount of oxygen (air) used to react carbon monoxide according to the subject invention is between 1.5 and 2 times the total carbon monoxide concentration (by volume) in the feed stream. Preferably, about 80% (by volume) of the total amount of oxygen (air) is added to the feed stream at the first oxygen (air) inlet means 60. The remainder of the oxygen (air), about 20% (by volume), is added to the process stream at the second oxygen (air) inlet means 48 as will be described subsequently. The quantity of oxygen (air) is critical to performance of the system. If too much oxygen (air) is added it will react with the hydrogen thereby reducing the hydrogen content which can be supplied to the fuel cell. If too little oxygen (air) is added, not enough carbon monoxide will react, thereby maintaining too high of a carbon monoxide content in the product stream for use in a fuel cell.

The oxygen (air) enters the flow controller 64 through the inlet 66. Preferably, the oxygen is obtained by using a predetermined quantity of air. Because the oxygen content of the air is known (a mixture comprising about 80% nitrogen and about 20% oxygen), the quantity of air having the predetermined quantity of oxygen can be measured by the flow controller 64 and delivered to the appropriate oxygen inlet means 60, 48. By using air, other gases, such as nitrogen, are introduced to the feed stream. The concentrations of these other gasses and their reactivity is minimal and their effect on the overall system performance is negligible.

The assembly 10 includes first heat exchanger means generally indicated at 20. The first heat exchanger means 20 is in fluid communication with the shift reactor outlet 18 through the feed stream conduit 19 for allowing the feed gases mixed with the first predetermined quantity of oxygen (air) to pass into the first heat exchanger 20. The feed gasses and oxygen (air) are then passed through the first heat exchanger means 20. In the first heat exchanger means 20, the feed gasses and the oxygen (air) are adjusted to a first predetermined temperature. In the preferred embodiment, the preferred first predetermined temperature of the feed gas is between about 160° C. to about 175° C.

The first heat exchanger means 20 includes a housing 22 which provides a reservoir for containing a fluid therein. A first coil 24 is in fluid communication with the feed stream conduit 19 and is immersed in the fluid within the reservoir defined by the housing 22. Preferably, the reservoir defined by the housing 22 contains a fluid that is a two phase material selected as a liquid that boils at the appropriate temperature. In the preferred embodiment, the liquid should boil at a temperature in the range of about 160° C. to about 175° C. Although there are many stable liquids known which will successfully serve as the active temperature control fluid, a compound such as 1,3,5 - trimethyl benzene which boils at 164.7° C. at one atmosphere pressure is one example that can be used to adjust the temperature of the feed stream to the first predetermined temperature.

The assembly further includes first reaction means generally indicated at 26. The first reaction means or assembly 26 is in fluid communication with the first coil 24 through the conduit 28. The first reactor assembly 26 comprises at least one reaction chamber 30. In the preferred embodiment, the reaction means 26 comprises a first reaction chamber 30 and a second reaction chamber 32. However, different applications may require different numbers of reaction chambers. It will be appreciated that any number of chambers may be utilized within the scope of the present invention.

Because two reaction chambers 30, 32 are used, the feed stream must be divided into first and second feed stream branches. The division preferably occurs at a T-fitting 29 connected to the conduit 28. The first feed stream branch is delivered to the first reaction chamber 30 by a conduit 31, connected to the T-fitting 29. The second feed stream branch is connected to the second reaction chamber by a conduit 33 secured to the T-fitting. It will be appreciated that the number of branches will equal the number of reaction chambers.

Each of the reaction chambers 30, 32 is a catalytic reaction chamber wherein the catalyst promotes the oxidation reactions described below. Due to the very limited oxygen flow rates, only a small hydrogen fraction is reacted. Preferably, each of the chambers 30, 32 is constructed to operate adiabatically. That is, heat flow does not occur either into or out of the catalyst bed from the surroundings. Rather, the heat produced during the oxidation reaction described below increases the temperature of the chamber including the catalyst, the catalyst supports, and the gaseous mixture in a localized zone of the catalyst chamber. Preferably, the exit side of the reaction chamber has a higher temperature than the entrance side. This heat is removed from the chambers 30,32 by convection as the gas streams pass therethrough.

In each of the reaction chambers 30, 32 the carbon monoxide content of the feed stream entering through the conduit 28 is preferentially oxidized to form carbon dioxide according to the reaction:

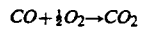

$$CO + \tfrac{1}{2}O_2 \rightarrow CO_2$$

It is also important to note that the hydrogen in the feed stream will react according to the reaction:

$$H_2 + \tfrac{1}{2}O_2 \rightarrow H_2O$$

The essence of the present invention is to preferentially oxidize the carbon monoxide without significantly reacting hydrogen of the feed stream. This is accomplished by choosing an appropriate catalyst to be used in the reaction chambers 30, 32, an appropriate amount of oxygen (air, as previously described) and an appropriate temperature as previously described. The requisite amount of oxygen (air) and the temperature are established prior to the feed stream entering the reaction chambers 30, 32. Too much oxygen (air) in the system needlessly reacts the hydrogen in the feed stream. Too little oxygen (air) does not allow enough of the carbon monoxide in the feed stream to react. At the appropriate temperature and oxygen (air) level and in the presence of the appropriate catalyst the carbon monoxide from the feed stream will be adsorbed on the catalyst to react with the oxygen (air), rather than reacting with the hydrogen.

Preferably, the catalyst enclosed by the reaction chambers 30, 32 comprises a finely divided metal or metal oxide supported on a high surface area ceramic support. Many different oxidation catalyst are known. Typically, these catalyst are formulated using platinum, rhodium, palladium, or ruthenium metals or alloys of these metals supported on a high surface area ceramic or metal monolith support. A typical, representative formulation used in accordance with the present invention is 0.5% platinum supported on an aluminum oxide support.

In the reaction chambers 30, 32 at the appropriate control parameters (i.e. temperature of between about 160° C. and 175° C. and an oxygen concentration equal to 80% (by volume) of the carbon monoxide in the feed stream) the carbon monoxide of the feed stream is preferentially adsorbed onto the reactive catalytic sites rather than the hydrogen. The catalytic sites provide faster oxidation rates for reaction of the adsorbed carbon monoxide rather than the oxidation rate for gas-phase hydrogen. Further, the carbon monoxide adsorption is greater than the adsorption of hydrogen at the temperature of between about 160° C. and 175° C. At lower temperatures, the carbon monoxide is preferentially adsorbed on the catalyst, but reactivity with oxygen is too slow for successful reactions. At higher temperatures, there is no significant preferential adsorption of carbon monoxide. The preferential adsorption of the carbon monoxide is useful only when the feed stream contains a relatively high carbon monoxide content.

In each of the reaction chambers 30, 32 the kinetics for the oxidation reactions are important. For the carbon monoxide oxidation, the rate equation is written as:

$$-dCO/dt = (k_{co}[CO][O_2])/(1 + K[CO])^2$$

The rate equation for the hydrogen oxidation is written as:

$$-dH_2dt = (k_{H2}[H_2][O_2])/(1 + K[CO])^3$$

In each of these equations, the rate (conversion frequency given in moles of reactants reacting each second in a specified catalyst volume) is shown as proportional to the rate constant, k, a function of temperature and catalyst composition. Under the conditions described above, the value of K, the catalyst/gas phase distribution coefficient is near 30, with a 1% carbon monoxide concentration. Therefore, the denominator term may approximate 1000. This represents a considerable retardation in the rate, both for carbon monoxide and the hydrogen oxidation reactions. This rate retardation provides a definitive advantage for preferentially reducing the carbon monoxide rather than the hydrogen in the feed stream. This is due to the fact that the carbon monoxide is preferentially adsorbed onto the reaction sites of the catalyst.

Oxidation of carbon monoxide in the feed stream to carbon dioxide generates heat. This thermal generation changes the temperature of the reacting system unless the heat is promptly removed. By utilizing first and second reaction chambers 30, 32 the increase of temperature in the system due to the oxidation of the carbon monoxide is decreased. Furthermore, by removing the reacted stream from the first and second chambers 30, 32 the heat is removed from the first and second reactor chamber 30, 32 by convection. A single reaction chamber could be used. The heat generated, however, may inhibit the preferential adsorption of the carbon monoxide on the catalysts. It will be appreciated that any number of chambers can be used within the scope of the present invention.

Upon completion of the reaction within the chambers 30, 32, (i.e. all of the first predetermined quantity of oxygen is used and the oxygen concentration is 0%) the process stream must be removed.

The design of two reaction chambers 30,32 decreases the residence time of the gas stream in the chambers. The resultant gas is quickly removed from the chambers 30, 32, in order to minimize an equilibrium reaction wherein the carbon dioxide is reduced to form additional carbon monoxide. The effects of the equilibrium reaction are minimized through a design using a short residence time.

After the preferential reaction of the carbon monoxide in the feed stream with the first predetermined amount of oxygen (air) has taken place (i.e. all of the oxygen has reacted), an intermediate process stream is formed. The composition of the intermediate process stream is hydrogen, carbon dioxide, water (steam), nitrogen (from the air) and carbon monoxide. The carbon monoxide content of the process stream is less than that of the feed stream. Because first 30 and second 32 reaction chambers are used, each reaction chamber forms a process stream branch. The first reaction chamber 30 forms a first process stream branch which exits the reaction chamber 30 through a conduit 36, and the second reaction chamber 32 forms a second process stream branch which exits the reaction chamber 32 through a conduit 38. The conduits 36 and 38 are connected at a T-fitting 40. At the T-fitting 40, the first and second process stream branches are combined to form the process stream. The number of process stream branches formed necessarily equals the number of reaction chambers used. All of the process stream branches are combined to form the process stream.

The assembly also includes second heat exchanger means generally indicated at 42. (Best shown in FIG. 2). The second heat exchanger means or assembly 42 is for adjusting the process stream to a second predetermined temperature. Preferably, the process stream enters the second heat exchanger assembly 42 through a conduit 44 connected to a housing 46 of the second heat exchanger means 42 (FIG. 2). The process stream then flows through the housing 46 and preferably in counter-flow arrangement to the feed stream in the conduit 19 exiting the shift reactor outlet 18. In this manner, the process stream is cooled, but remains at a temperature greater than the first predetermined temperature and the feed stream is simultaneously heated. The thermal energy from the feed stream exiting the shift reactor 12 is used to control the temperature of the process stream in the housing 46. It will be appreciated that the process stream can be cooled or heated in any manner within the scope of the present invention. That is, the process stream can be cooled or heated with water or steam, for example, without any thermal energy transfer between the feed and process streams.

The second predetermined temperature is selected to preferentially react the carbon monoxide content of the process stream with the second predetermined quantity of oxygen (air) rather than the hydrogen in the process stream. In the preferred method, the second predetermined temperature is warmer that the first predetermined temperature. Therefore, the process stream must be thermally controlled in the second heat exchanger assembly 42. The second predetermined temperature is preferably about 190° C. using a particular catalyst formulation. The assembly includes a second oxygen (air) inlet means 48 connected to a conduit 50. The conduit 50 is in fluid communication with the outlet of the housing 46 of the second heat exchanger 42. In this manner, the process stream exits the second heat exchanger means 42 through the conduit 50 and is mixed with a second predetermined quantity of oxygen (air) at the second oxygen (air) inlet 48 inside the conduit 50. The second oxygen (air) inlet means 48 comprises an oxygen (air) supply conduit 52 providing fluid communication between the oxygen (air) flow regulator 64 and the conduit 50.

The process stream, which is mixed with the second predetermined quantity of oxygen (air) and is at the second predetermined temperature (in the preferred method about 190° C.), flows into a second reaction means generally indicated at 54 through the conduit 50. The second reaction means or assembly 54 is for reacting the carbon monoxide in the process stream with the second predetermined quantity of oxygen (air) at the second predetermined temperature without substantial reaction of the hydrogen in the process stream to produce a product stream consisting essentially of hydrogen, carbon dioxide, water and carbon monoxide with less carbon monoxide content than in the process stream.

The second reaction means 54 comprises a second stage reaction chamber 56 having a catalyst therein. The catalyst used may or may not be the same as used in each of the first and second reaction chambers 30, 32 and described previously.

The preferential oxidation of the carbon monoxide of the process stream occurs in the second stage reaction chamber 56 by taking advantage of the relative reaction rates for the oxidation of carbon monoxide and hydrogen. At a higher temperatures, carbon monoxide reacts faster The carbon monoxide content of the process stream entering the second reaction chamber 56 is relatively low. At the conditions of low carbon monoxide concentration, the second predetermined quantity of oxygen and the second predetermined temperature, the reaction rate equations for oxidation of carbon monoxide and hydrogen are as follows:

$$-DCO/dt = K_{co}[CO][O_2]$$

$$-DH_2 dt = K_{H2}[H_2][O_2]$$

The change (decrease) in activation energy of the carbon monoxide reaction with temperature is larger than that for the hydrogen oxidation reaction. The rate change for carbon monoxide oxidation is therefore more than that for the hydrogen oxidation as the system temperature increases. At the higher second predetermined temperature, the reaction rate of carbon monoxide is, consequently, greater than the reaction rate of hydrogen.

In this second stage, the carbon monoxide concentration is already about 1000 times lower than the hydrogen concentration. In the presence of low carbon monoxide concentration, the effective rate of oxidation of carbon monoxide is slow. The rate can be increased by increasing the oxygen (air) concentration to the second predetermined level (about 20% volume of the total carbon monoxide content in the feed stream) as previously described. In this manner, there is more interaction (i.e. collisions) between the oxygen and the carbon monoxide Again, if too much oxygen (air) is injected, excessive hydrogen consumption will needlessly occur.

The second stage utilizes the two aforementioned features to promote selective or preferential carbon monoxide oxidation. First, the gas inlet temperature is increased over the first predetermined temperature so that the relative reaction rate (the $-DCO/dt$ contrasted to $-DH_2/dt$) are altered favorably to accelerate the carbon monoxide oxidation. Secondly, the oxygen (air) concentration is increased to the level described as the second predetermined amount of oxygen (air) to values where the oxygen/carbon monoxide concentration ratio is 5 or more. Under these conditions, the oxidation rate is simply a "race" between carbon monoxide and hydrogen oxidation and the oxidation rate differences favor carbon monoxide oxidation. All of the oxygen is consumed during this process and once the oxygen concentration reaches 0%, both oxidation processes (of hydrogen and carbon monoxide) stop. At this point, the product gasses must be cooled to prevent carbon monoxide formation.

It is noted that the total quantity of oxygen (air) as the second predetermined quantity of oxygen (air) is substantially less than the first predetermined quantity of oxygen (air). Therefore, the oxidation reactions generate less heat than the oxidation reactions in the first stage. As a result, only one reaction vessel or chamber need be used in the second stage. Any number of reaction chambers, however, can be used within the scope of the present invention.

After reaction of the process stream, the resultant product stream now has a carbon monoxide content low enough to be used in a fuel cell. The product stream must be quickly removed from the second stage reaction chamber 56 and cooled By decreasing the residence time, and rapidly cooling the product stream, the equilibrium reaction of carbon dioxide reduction to form carbon monoxide and water is minimized.

The product stream passes from the reaction chamber 56 to the conduit 68. The conduit 68 carries the product stream to a heat exchanger where the product stream is cooled to a temperature for use in a fuel cell. In the preferred embodiment, the conduit 68 passes into the first heat exchanger 20. The conduit 68 includes a coiled portion 70 which is immersed in the fluid contained in the reservoir defined by the housing 22. As was described earlier as an example, the fluid in the reservoir in the range of is about 160° C. to about 175° C. Therefore, the product stream is cooled to this temperature (that of the fluid) before leaving the first heat exchanger 20.

In the preferred embodiment, further cooling of the product stream is desired. The conduit 68 is connected to a third heat exchanger means or assembly generally indicated at 72. The third heat exchanger assembly 72 preferably comprises a parallel pipe type heat exchanger. The conduit 68 comprises the inner pipe of smaller diameter. A larger pipe or housing 74 surrounds the portion of the conduit 68 in the third heat exchanger assembly 72.

A heat transfer medium, preferably water, enters the housing 74 through an inlet 76. The water flows through the housing in the same direction as the product stream flows through the conduit 68. That is, the flow in the heat exchanger is what is commonly referred to as parallel flow. The water cools the product stream to a desired temperature. The water then exits the housing 74 through the heat exchanger outlet conduit 78. The outlet conduit 78 is connected to a T-fitting 80 (best shown in FIG. 3). The T-fitting is also connected to the bottom portion of the housing 74 through a bypass conduit 82. A metering valve 84 is operatively connected to the bypass conduit 82.

To achieve the desired temperature for the product stream in the third heat exchanger assembly 72, the amount of water passing through the housing 74 is regulated by the metering valve 84. If the product stream needs to be cooled, the metering valve 84 is closed to allow the water to pass through the housing 74. The product stream should not be cooled so as to allow the steam therein to condense. Therefore, if the product stream temperature is too low, the metering valve 84 is opened thereby allowing the water to pass through the bypass conduit 82 instead of the jacket 74. By regulating the flow of water using the metering valve, the appropriate exit temperature of the product stream can be achieved.

The water exiting the housing 74, either through the outlet conduit 78 or through the bypass conduit 82, are combined at the T-fitting 80. The water can be further utilized in the first heat exchanger 20. That is, the water exiting the T-fitting 80 passes through a cooling conduit 86 connected to the outlet side of the T-fitting 80. The cooling conduit 86 passes into the housing 22 of the first heat exchanger 20. Preferably, the cooling conduit 86 is supported over the liquid in the housing 20 and has a plurality of fins 88 thereon. In this manner, the water flowing through the cooling conduit 86 is used to condense the liquid contained in the reservoir defined by the housing 22 which boils or is evaporated while cooling either of the feed or product streams.

Operation of the system will be described with reference to one specific example and one specific feed stream composition. Initially, a hydrogen rich gas stream is formed by reforming methanol. This stream is transferred to the shift reactor 12 where steam is added through the water inlet 16. This prompts the shift reaction. The gases emanating from the shift reactor 12 through the shift reactor outlet 18 to the feed stream conduit 19 are at about 190° C. A typical composition of the feed stream is about 66.6% hydrogen, about 11.1% water (steam), about 1.0% carbon monoxide and about 21.3% carbon dioxide. All percentages used herein are volumetric percentages.

Oxygen (from air) is added to the feed stream conduit 19 by the first oxygen inlet conduit 62. The flow quantity of oxygen (air) is metered by the flow controller 64. The quantity of oxygen (air) added changes the volumetric composition of the feed stream to: about 62.0% hydrogen, about 10.3% water (steam), about 0.93% carbon monoxide, about 19.8% carbon dioxide, about 1.4% oxygen and about 5.6% nitrogen These gases pass through the coil 24 immersed in the fluid (1, 3, 5 - trimethyl benzene) contained in the reservoir defined by the housing 22 of the first heat exchanger assembly 20. In the first heat exchanger assembly 20, the temperature of the gasses is reduced to about 165° C. These gasses are then split at the T-fitting into first and second feed stream branches. (It is assumed that the gasses are uniformly mixed; thus, the volumetric reaction of each branch is the same as that of the feed stream.) The first feed stream branch passes through the conduit 31 and into the first reaction chamber 30. Similarly, the second feed stream branch passes through the conduit 33 and into the second reaction chamber 32.

Each of the reaction chambers has a catalyst, comprised of 0.5% platinum supported on an aluminum oxide support, therein. At these conditions, the carbon monoxide of the feed stream branches is adsorbed onto the catalyst to preferentially react the carbon monoxide content with minimal simultaneous reaction of the hydrogen. The reaction takes place until all of the oxygen is consumed in the respective reaction chambers. After reaction, first and second process streams are formed The first process stream branch exits the first reaction chamber 30 through the conduit 36. Similarly, the second process stream branch exits the second reaction chamber 32 through the conduit 38. The conduits 36, 38 join at the T-fitting 40. At the T-fitting 40, the first and second process stream branches are combined to form the process stream. The process stream has the composition: about 60.9% hydrogen, about 12.4% water (steam), about 0.05% carbon monoxide, about 21.0% carbon dioxide and about 5.7% nitrogen. The temperature of the process stream (about 220° C.) is considerably higher then the temperature of the feed stream. This is because the heat generated during the oxidation reactions in the first and second reaction chambers 30, 32 is removed from the chamber 30,32 by the gasses of the process stream branches by convective heat transfer. The temperature of the process stream must be cooled but remain elevated above that entering the initial reaction chambers, 30 and 32.

The process stream flows from the T-fitting 40 through the conduit 44 to the housing 46. The process stream then flows, through the housing 46 in counter-flow relationship to the feed stream conduit 19. Thermal energy from the process stream is transferred to the feed stream to cool the temperature of the process stream to about 190° C.

The process stream exits the housing 46 by the conduit 50. A second oxygen inlet 52 is also connected to the conduit 50. A second flow quantity of oxygen (air) is metered using the flow controller 64 and mixed with the process stream at the second oxygen inlet 52 in the conduit 50. The composition of the stream becomes: about 59.5% hydrogen, about 12.1% water (steam), about 0.05% carbon monoxide, about 0.5% oxygen and about 7.4% nitrogen. The temperature is about 190° C.

The process stream mixed with oxygen is then passed into the second stage reaction chamber 56 having a catalyst (as previously described) therein. At these conditions, the rate of oxidation of the carbon monoxide content is more rapid than the rate of oxidation of hydrogen. Therefore, the carbon monoxide of the process stream will preferentially react with the oxygen; a hydrogen reaction will also occur, but this reaction is limited by the very small quantity of remaining oxygen. The reaction in the second stage reaction chamber 56 is complete when all the oxygen is consumed. The result of the reaction is a product stream consisting essentially of about 58.9% hydrogen, about 13.1% water (steam), much less than about 0.01% carbon monoxide, about 20.6% carbon dioxide and about 7.4% nitrogen.

The product stream is quickly removed from the second stage reaction chamber 56 and cooled to a temperature below the first predetermined temperature to prevent an equilibrium reaction that would produce additional carbon monoxide and water.

The product stream passes through the conduit 68 to the coiled portion 70 which is immersed in the fluid of the first heat exchanger assembly 20. The product stream is cooled to about 165° C. Further cooling of the product stream is accomplished by passing the product stream through the third heat exchanger assembly 72. Specifically, a housing 74 surrounds a portion of the conduit 68 to form a parallel pipe heat exchanger. Water is added to the housing 74 through the inlet 76 and flows parallel to the product stream in the conduit 68. The flow of water through the housing 74 is regulated by the metering valve 84 connected to the bypass conduit 82. The water exiting the housing, either through the conduit 78 or the bypass conduit 82 passes to the cooling conduit 86. The cooling conduit 86 is supported in the housing 22 of the first heat exchanger assembly 20 above the fluid contained therein. The cooling conduit 86 has a plurality of fins 88 thereon. The cooling conduit 86 condenses the evaporated fluid in the housing 22 and allows the condensed fluid to be collected in the reservoir defined by the housing 22.

The cooled product stream can now be used as fuel for a fuel cell that consumes hydrogen.

The figures used represent one embodiment of the present invention. Details of heat exchanger design, catalyst chamber design, flow metering and mixing valves required to manufacture this embodiment are well known to one skilled in the art and need not be described. Moreover, other adaptations of the present invention might be required if different process temperatures are required. Selecting different catalyst systems, i.e. different catalyst formulations, may dictate varying process temperatures, for instance. Thus, the drawing of FIG. 1 must be considered as a specific embodiment selected to show a preferred method of reduction designed using one particular catalyst type. Heat exchanger placement depends upon desired control temperatures, and therefore other physical designs may be mandated for different process conditions. This invention considers all such process conditions and designs.

The invention has been described in an illustrative manner, and it is to be understood that the terminology which has been used is intended to be in the nature of words of description rather than of limitations.

Obviously, many modifications and variations of the present invention are possible in light of the above teachings. It is, therefore, to be understood that within the scope of the appended claims the invention may be practiced otherwise then as specifically described.

The embodiments of the invention in which an exclusive property or privilege is claimed are defined as follows:

1. In a method of operating a $H_2$-$O_2$ fuel cell system comprising the principal steps (1) providing a hydrogen-rich fuel gas having a carbon-monoxide content sufficient to poison the fuel cell's catalyst, (2) subjecting said fuel gas to a $CO + H_2O$ shift reaction to produce a feed stream consisting essentially of hydrogen, carbon dioxide, water and less than about one percent by volume carbon monoxide, and (3) introducing said feed stream into said fuel cell, the improvement comprising after said shift reaction and before introducing said feed stream into said fuel cell:

adjusting the temperature of said feed stream to a first temperature selected to promote adsorption of said carbon monoxide onto a first catalyst selected to preferentially adsorb carbon monoxide rather than hydrogen from said feed stream at said first temperature;

introducing a first quantity of oxygen into said feed stream, said quantity being in stoichiometric excess to said carbon-monoxide and selected to promote preferential oxidation of said carbon monoxide on said first catalyst in the presence of said $H_2$;

absorbing the carbon monoxide in the feed stream onto said first catalyst and thereon preferential oxidizing it with said first quantity of oxygen at said first temperature in a first oxidation stage to form a process stream consisting essentially of hydrogen, carbon dioxide, water and carbon monoxide wherein the carbon monoxide content is at least about one order of magnitude less than the carbon-monoxide content of said feed stream;

removing the process stream from said first catalyst;

introducing a second quantity of oxygen into said process stream, said second quantity being less than said first quantity, in stoichiometric excess to the carbon monoxide in the process stream, and selected to promote preferential oxidation of said carbon monoxide on a second catalyst selected to promote more rapid oxidation of carbon monoxide than hydrogen at a second temperature which is higher than said first temperature and selected to promote said rapid oxidation;

adjusting the temperature of the process stream to said second temperature; and reacting the carbon monoxide in the process stream with said second quantity of oxygen on said second catalyst at said second temperature in a second reaction stage to form a product stream for introduction into said fuel cell consisting essentially of hydrogen, carbon dioxide, water and carbon monoxide wherein the carbon monoxide content is less than about 0.01% by volume.

2. A method as set forth in claim 1 further characterized by cooling the product stream.

3. A method as set forth in claim 1 characterized by splitting the feed stream into first and second feed stream branches prior to reacting the feed stream with the first quantity of oxygen for parallel flow into the first reaction stage to reduce the residence time of the feed stream in the first reaction stage and thereby limit the heat transferred to the catalyst in the first reaction stage.

4. A method as set forth in claim 3 further characterized by providing first and second reaction chambers each containing said first catalyst for treating the feed streams from said first and second branches.

5. A method as set forth in claim 4 further characterized by preferentially reacting the carbon monoxide rather than the hydrogen in the first feed stream branch in the first reaction chamber to form a first process stream branch consisting essentially of hydrogen, carbon dioxide, water and carbon monoxide and simultaneously preferentially reacting the carbon monoxide in the second feed stream branch in the second reaction chamber to form a second process stream branch consisting essentially of hydrogen, carbon dioxide, water and carbon monoxide.

6. A method as set forth in claim 5 further characterized by combining the first and second process stream branches to form the process stream.

7. A method as set forth in claim 1 further characterized by establishing the first quantity of oxygen to react with the carbon monoxide of the feed stream by utilizing an amount of oxygen that is about 80% of the total amount of the combined first and second quantities of oxygen wherein the total amount of oxygen by volume is in the range of 1.5 to 2.0 times the carbon monoxide concentration by volume in the feed stream.

8. A method as set forth in claim 1 further characterized by establishing the second quantity of oxygen to react with the carbon monoxide of the process stream by utilizing an amount of oxygen that is about 20% of the total amount of the combined first and second quantities of oxygen wherein the total amount of oxygen by volume is in the range of 1.5 to 2.0 times the carbon monoxide concentration by volume in the feed stream and so as to provide an oxygen to carbon monoxide ratio in the process stream of 5 or greater.

9. A method as set forth in claim 1 further characterized by obtaining the oxygen from air.

10. A method as set forth in claim 1 further characterized by utilizing a temperature of between about 164+ C. and about 170° C. as the first temperature and by utilizing a temperature of about 190° C. as the second temperature.

11. A method as set forth in claim 1 further characterized by utilizing a heterogeneous catalyst for each of the first and second catalysts.

12. A method as set forth in claim 11 further characterized by utilizing a metal catalyst supported on a support for each of the first and second catalysts, wherein the support is either metal or ceramic.

13. A method as set forth in claim 11 further characterized by utilizing a metal oxide catalyst supported on a support for each of the first and second catalyst, wherein the support is either metal or ceramic.

14. A method as set forth in either claim 12 or 13 further characterized by utilizing a catalyst selected from the group consisting of platinum, rhodium, palladium, ruthenium or alloys thereof supported on a ceramic support, such as aluminum oxide for either of the first and second catalysts.

15. A method as set forth in claim 14 further characterized by removing water from the feed stream prior to adjusting the feed stream to the first temperature such that all of the feed stream, process stream and product stream are substantially free of water.

16. An assembly for reducing the carbon monoxide content of a hydrogen-rich, CO-contaminated fuel feed stream to a $H_2$-$O_2$ fuel cell, said assembly comprising:
first oxygen inlet means for providing a first quantity of oxygen to the feed stream;
first heat exchanger means having an inlet and outlet for adjusting the temperature of the feed stream to a first temperature;
first reaction means in fluid communication with the outlet of said first heat exchanger means, said reaction means having a catalyst therein for preferentially adsorbing the carbon monoxide of the feed stream on said catalyst at said first temperature and to react said carbon monoxide with the first quantity of oxygen without substantial reaction of the hydrogen in the feed stream to form a process stream consisting essentially of hydrogen, carbon dioxide, water and carbon monoxide with less carbon monoxide content than in the feed stream;
second heat exchanger means having an inlet in fluid communication with said first reaction means for receiving the process stream and an outlet for exhausting said stream from said heat exchanger, said heat exchanger serving to adjust the temperature of the process stream to a second temperature which is higher than the first temperature;
second oxygen inlet means downstream of said first reaction means for allowing a second quantity of oxygen to be mixed with the process stream; and
second catalyst-filled reaction means in fluid communication with the outlet of said second heat exchanger means for receiving the process stream mixed with the second quantity of oxygen and for preferentially reacting the carbon monoxide in the process stream with the second quantity of oxygen at the second temperature without substantial reaction of the hydrogen in the process stream to form a product stream consisting essentially of hydrogen, carbon dioxide, water, and carbon monoxide with less carbon monoxide content than in the process stream.

17. An assembly as set forth in claim 16 further characterized by including oxygen flow controller means for metering said first and second quantities of oxygen and for delivering said first quantity of oxygen to said first oxygen inlet means and for delivering said second quantity of oxygen to said second oxygen inlet means.

18. An assembly as set forth in claim 17 further characterized by said first and said second reaction means forming at least two catalytic reaction stages that add oxygen in decreasing volume concentrations, so that the volume of oxygen entering said first reaction stage is greater than the volume of oxygen added to any subsequent stage.

19. An assembly as set forth in claim 18 further characterized by said first and said second reaction stages designed to maximize preferential oxidation of carbon monoxide through the use of selective adsorption in said first stage and through the use of higher kinetic rate in said second stages.

20. An assembly as set forth in claim 19 further characterized by said first reaction stage comprising first and second reaction chambers having said catalyst therein.

21. An assembly as set forth in claim 20 further characterized by said second reaction stages comprising a second stage reaction chamber having said catalyst therein.

22. An assembly as set forth in claim 21 further characterized by including splitting means for dividing the feed stream into first and second feed stream branches, said first feed stream branch entering said first reaction chamber for reaction therein to form a first process stream branch, said second feed stream branch entering said second reaction chamber for reaction therein to form a second process stream branch.

23. An assembly as set forth in claim 22 further characterized by including combining means for combining the first and the second process stream branches to form the process stream.

24. An assembly as set forth in claim 19 further characterized by including third heat exchanger means in fluid communication with said second reactor means for receiving the product stream and for rapidly cooling the product stream to a third temperature which is less than said first temperature to prevent the reduction reaction of carbon dioxide with hydrogen to thereby prevent generation of carbon monoxide and water.

* * * * *